United States Patent [19]

Iino et al.

[11] Patent Number: 5,224,075
[45] Date of Patent: Jun. 29, 1993

[54] APPARATUS FOR MEASURING THE VELOCITY OF A MOVING BODY

[75] Inventors: Hiroshi Iino, Kobe; Shigeru Aoyama, Sanda; Shinji Ishihara, Takarazuka, all of Japan

[73] Assignee: Furuno Electric Co., Ltd., Kyogo, Japan

[21] Appl. No.: 775,986

[22] PCT Filed: Mar. 26, 1991

[86] PCT No.: PCT/JP91/00384

§ 371 Date: Nov. 15, 1991

§ 102(e) Date: Nov. 15, 1991

[87] PCT Pub. No.: WO91/14953

PCT Pub. Date: Oct. 3, 1991

[30] Foreign Application Priority Data

Mar. 26, 1990 [JP] Japan .................. 2-76436

[51] Int. Cl.$^5$ .................. G01S 15/00
[52] U.S. Cl. .................. 367/91; 367/90
[58] Field of Search .................. 367/89, 90, 91

[56] References Cited

U.S. PATENT DOCUMENTS 3,953,823 4/1976 Katakura .................. 367/91
4,104,912 8/1978 Clavelloux et al. .................. 367/91

Primary Examiner—Daniel T. Pihulic

[57] ABSTRACT

A system measures the velocity of a moving body such as a ship and a water body. The system uses a first apparatus which measures the speed of a moving body by detecting a phase difference between a reference signal and echo signals resulting from a transmitted ultrasonic signal, implementing a Fourier transformation on the phase difference data obtained, computing the speed of the ship with respect to the water based on the Fourier spectrum data, and, computing the velocity of a water current based on the speed of the ship with respect to the ground and the speed of the ship with respect to the water obtained. The system also uses a second apparatus which measures the speed of a moving body by detecting the period for each pulse in received echo signals, obtaining a Doppler shift frequency from an inverse value of the period obtained, computing the speed of the ship with respect to the water based on the Doppler shift frequency, and computing the velocity of the water current at a depth at which the echo signals are generated based on the speed of the ship with respect to the ground and the speed of the ship with respect to the water obtained. The system also includes a switch to select either the first apparatus for measuring the speed of a moving body or the second apparatus for measuring the speed of a moving body.

37 Claims, 10 Drawing Sheets

APPARATUS FOR MEASURING THE VELOCITY OF A MOVING BODY

FIELD OF THE INVENTION

The present invention relates to an apparatus for measuring the velocity of a moving body such as a ship and a water body, and more particularly, relates to a system for detecting the speed of a ship or the velocity of a water current flow by utilizing the Doppler effect generated with ultrasonic signals propagating in the water.

TECHNICAL BACKGROUND OF THE INVENTION

Echo signals reflected by things in water such as planktons and small dust and the like and by the seabed and resulting from ultrasonic signals emitted from a transmitting-and-receiving transducers mounted on the bottom of a ship have Doppler shifted frequencies due to the Doppler effect and allow the detection of the speed of the own ship or the velocity of a water current by measuring the Doppler shifted frequencies.

For example, when the speed V of the ship is desired to be detected, an ultrasonic signal (having a carrier frequency "$f_o$") is emitted downwardly in an oblique direction (at an angle $\theta$ with respect to the horizontal) by means of a transmitting-and-receiving transducer as shown in FIG. 4. A Doppler frequency shift "$f_d$" included in echo signals reflected by the seabed will be as follows:

$$fd = 2V \cdot fo \cdot \cos\theta / c \qquad (1)$$

where "c" is the speed of sound in the water. Accordingly, the velocity V of a ship can be obtained from the following equation which is a modification of the equation (1).

$$V = fd \cdot c / (2fo \cdot \cos\theta) \qquad (1')$$

Thus, the Doppler frequency shift "fd" needs to be detected and the following three methods are conceivable to obtain it.

① Frequency Tracking Method

A variable frequency oscillator is provided in a measuring device and is controlled so that a difference between the frequency of output signals from the oscillator and the frequency of echo signals becomes zero. The frequency of the echo signals will be obtained from the varied frequencies.

With this method, however, the oscillator is a complex circuit in which a PLL system and the like is used. There are limitations in the frequency tracking speed and in the range thereof. It is difficult to detect the Doppler shift frequency with high precision based on echo signals resulting from one transmission and reception of ultrasonic wave signals. Moreover, due to the limitation of the tracking speed, a tracking circuit is required for a beam formed by each of transducers and for each liquid layer to be measured, so that a large number of parts are needed for an apparatus such as a current flow metering system using a plurality of beams and receiving echo signals from a plurality of water layers to be investigated.

② Pulse Counting Method

As shown in FIG. 5, this is a method to set a certain duration of time from "t0" to "t1" and to count the number of pulses of the echo signal detected within the time duration. Since frequency is expressed by the number of waves (number of pulses) in one second, the Doppler shifted frequency can be obtained in accordance with n/Δt, where the time duration for measurement is Δt and the number of pulses counted in the time duration is "n".

However, in order to detect the frequency with high precision, a time duration for measurement must be set to be long. This increases the thickness of a layer to be investigated that corresponds to the time from a time instant "t0" to another time instant "t1" (as shown in FIG. 4). As a result, resolution in the depth direction is degraded, and thus, it becomes difficult to measure a Doppler shift frequency of an echo signal produced at a desired depth.

③ Period Detecting Method

This is a method to obtain a time Δt required for counting a certain number of pulses "n" included in an echo signal, as opposed to the method ②, and then to calculate an average period T (=Δt/n) per one pulse included in the echo signal and to invert the period (1/T) to obtain a Doppler shifted frequency. This method measures a time duration corresponding to n pulses included in the echo signal with count clock pulses having an extremely high repetition frequency as compared to the frequency of the echo signal so that it is possible to obtain a Doppler shifted frequency with higher precision as compared to the method ②.

However, echo signals reflected by a water body including planktons and the like are generally very weak and do not have a good S/N ratio. As a result, there may be cases that pulses being counted are interrupted, so that a time for measurement is prolonged. Moreover, pulses having an abnormal frequency (period) may be contained in echo signals due to noise and the like, and when the abnormal pulses are counted, the time for measurement will be shortened. Accordingly, in the both cases, the accuracy for detecting a Doppler shifted frequency is degraded. Furthermore, as stated with the method ②, there has been a problem that an echo generated at a desired depth cannot be accurately derived (time "t1" in FIG. 4 changes).

As apparent from the foregoing explanation, in order to accurately detect a Doppler shifted frequency, it becomes important to meet each of the following requirements:

1) a Doppler shifted frequency should be detected by emitting one search signal and receiving echo signals resulting therefrom;

2) successive measurements for investigating multipoints without defining layers should be implemented (simplification of hardwares);

3) the thickness of a layer to be investigated (time duration for measurement) should be decreased to improve measurement resolution in a depth direction; and 4) the Doppler shift frequency should be less influenced by noise and the like.

On the other hand, in recent years, studies on applying a Fourier Transformation in determining a frequency with high accuracy has been actively conducted. For example, there has been known "High Accuracy Frequency Determination Method Using FFT" by Makoto Tabei and Mitsuhiro Ueda (Journal of the Electronics Information and Communication Society, May 1987, pages 798 through 805). This frequency determination method implements a Fourier transformation after multiplying data inputted in a time divisional fashion by the Hanning window and detects frequencies with high precision based on an amplitude ratio of the maximum amplitude of signal and the signal amplitude of a frequency adjacent to the frequency of the maximum amplitude signal and from properties of a response function of the Hanning window. It is to be noted that the Hanning window is expressed by an equation (3) in page 799 of the aforementioned Journal of the Electronics Information and Communication Society and the determination of frequencies by interpolation is presented by Expression (16) in page 800 of the same.

DISCLOSURE OF THE INVENTION

One object of the present invention is to provide an apparatus measuring the velocity of a moving body by measuring the speed of a moving body, which is mounted on the ship and detects the speed of the ship with respect to the water by detecting Doppler shifted frequencies generated with ultrasonic echo signals propagating in the water.

Another object of the present invention is to provide an apparatus for measuring the velocity of a moving body which is mounted on the ship and detects the speed of the ship with respect to the seabed or with respect to the water by detecting Doppler shifted frequencies generated in ultrasonic wave echo signals propagating in the water.

Another object of the present invention is to provide a ship-borne apparatus measuring the velocity of a moving body by measuring the velocity of a water current flow at a depth by detecting Doppler shifted frequencies generated in ultrasonic wave echo signals propagating in the water.

Another object of the present invention is to provide a ship-borne apparatus measuring the velocity of a moving body by measuring the speeds of current flows at a plurality of depths by detecting Doppler shifted frequencies generated with ultrasonic wave echo signals propagating in the water.

Another object of the present invention is to provide an apparatus measuring the velocity of a moving body by detecting, with high precision, Doppler shifted frequencies generated with ultrasonic echo signals propagating in the water by utilizing FFT (Fast Fourier Transformation).

Another object of the present invention is to provide an apparatus measuring the velocity of a moving body by detecting, with high precision, Doppler shifted frequencies generated in ultrasonic wave echo signals propagating in the water by utilizing FFT (Fast Fourier Transformation) and by measuring the speed of the ship with respect to the seabed or with respect to the water based on the Doppler shifted frequencies obtained.

Another object of the present invention is to provide an apparatus measuring the velocity of a moving body by detecting, with high precision, Doppler shifted frequencies generated in ultrasonic wave echo signals propagating in the water by utilizing FFT (Fast Fourier Transformation) and by measuring the velocity of water current flows at one or at a plurality of depths based on the Doppler shifted frequencies obtained.

Another object of the present invention is to provide an apparatus measuring the velocity of a moving body by detecting Doppler shifted frequencies generated in ultrasonic wave echo signals propagating in the water and by measuring the speed of the ship with respect to the water at one depth or at each of a plurality of depths based on the Doppler shifted frequencies obtained and at the same time by measuring the speed of the ship with respect to the ground by using a navigational aid device and by detecting the velocity of current flows at one or at a plurality of depths based on the two kinds of the speeds.

Another object of the present invention is to provide an apparatus measuring the velocity of a moving body by detecting, with high precision, Doppler shifted frequencies generated in ultrasonic echo signals propagating in the water by utilizing FFT and by measuring the speed of the ship with respect to the water at one depth or at each of a plurality of depths based on the Doppler shifted frequencies obtained and at the same time by measuring the speed of the ship with respect to the ground by using a navigational aid device and by detecting the velocity of currents at one or at a plurality of depths based on the two kinds of the speeds.

Another object of the present invention is to provide an apparatus measuring the velocity of a moving body by accurately obtaining the repetition period of pulses making carrier signals of ultrasonic echoes and by detecting Doppler shifted frequencies with high precision based on the inverse value of the repetition period.

Another object of the present invention is to provide an apparatus measuring the velocity of a moving body by accurately obtaining the repetition period of pulses making carrier signals of ultrasonic wave echoes and by detecting Doppler shifted frequencies with high precision based on the inverse value of the repetition period and by detecting the speed of the ship with respect to the water or with respect to the seabed based on the Doppler shifted frequencies obtained.

Another object of the present invention is to provide an apparatus measuring the velocity of a moving body by accurately obtaining the repetition period of pulses making carrier signals of ultrasonic wave echoes and by detecting Doppler shifted frequencies with high precision based on the inverse value of the repetition period and by measuring the velocity of water current flows based on the Doppler shifted frequencies obtained.

Another object of the present invention is to provide an apparatus measuring the velocity of a moving body by accurately obtaining the repetition period of pulses making carrier signals of ultrasonic wave echoes and by detecting Doppler shifted frequencies with high precision based on the inverse value of the repetition period and by measuring the speed of the ship with respect to the water or with respect to the ground based on the Doppler shifted frequencies obtained and by obtaining the velocity of current flows based on the speed of the ship with respect to the water and the speed of the ship with respect to the ground.

Another object of the present invention is to provide an apparatus measuring the velocity of a moving body by accurately obtaining the repetition period of pulses making carrier signals of ultrasonic wave echoes and by detecting Doppler shifted frequencies with high precision based on the inverse value of the repetition period and by measuring the speed of the ship with respect to the water at one depth or at a plurality of depths based on the Doppler shifted frequencies obtained and by obtaining at the same time the speed of the ship with respect to the ground by utilizing a navigational aid device and by detecting the velocity of current flows at one or at a plurality of depths based on the two kinds of the speeds.

Another object of the present invention is to provide a system measuring the velocity of a moving body which comprises a first apparatus for measuring the speed of a moving body for by detecting, with high precision, Doppler shifted frequencies generated in ultrasonic wave echo signals propagating in the water by utilizing FFT (Fast Fourier Transformation) and for by measuring the speed of the ship with respect to the water or with respect to the ground; a second apparatus for measuring the speed of a moving body for by accurately obtaining the repetition period of pulses making carrier signals of ultrasonic wave echoes and for by detecting Doppler shifted frequencies with high precision based on the inverse value of the repetition period and for by measuring the speed of the ship with respect to the water or with respect to the seabed; and switch means for switching to select the first apparatus for measuring the velocity of a moving body or the second velocity measuring apparatus.

Another object of the present invention is to provide an apparatus for measuring the speed of a moving body by detecting frequencies with high precision by averaging low S/N ratio echoes reflected by a layer in the water in the frequency axis and thus measuring the speed of water currents and by detecting the velocity of the ship with high precision.

A first feature of the present invention is to provide an apparatus measuring the velocity of a moving body for detecting Doppler shifted frequencies generated in ultrasonic wave echo signals propagating in the water to detect the speed of a ship, which comprises a phase difference detecting circuit for detecting phase differences between the echo signals detected during a certain measurement time and reference signals and a computing circuit for implementing a Fourier transformation on the phase difference data obtained by the phase difference detecting circuit to detect Doppler shifted frequencies based on a Fourier spectrum obtained and for computing the speed of the ship with respect to the water or with respect to the seabed or the velocity of water current flows based on the Doppler frequency shifts obtained.

In order to find the speed of the ship with respect to water or with respect to the ground, it is required to, firstly, obtain the Doppler frequency shift in the equation (1'). The first feature of the present invention is as follows:

There is obtained the phase $\theta e(t)$ of echo signals reflected by the ground or by liquid layers in the water at a time instant "t";

the phase is trigonometrically transformed to obtain the following signals R(t) and I(t), $$R(t) = \cos \theta e(t)$$

$$I(t) = \sin \theta e(t) \qquad (2)$$

then the Doppler shift frequency is determined by multiplying the resultant transformed signals supplied in a time divisional fashion by the Hanning window, implementing the Fourier transformation thereon and applying frequency-interpolation thereon in accordance with the aforementioned "High Precision Frequency Determination Method Using FFT"; and the speed of the ship with respect to the ground or with respect to the water is obtained based on the Doppler frequency shift obtained. It is to be noted that only relative values are obtained, since amplitude information is normalized. But, this is not a problem, since the frequency is desired to be obtained here.

A second feature of the present invention is to provide an apparatus measuring the velocity of a moving body for detecting Doppler shifted frequencies generated in ultrasonic wave echo signals propagating in the water to detect the velocity of current flows or the speed of a ship or the like which comprises a period detecting circuit for detecting the time period for each pulse of the echo signal during a given measurement time, a period judging circuit for judging the time period as normal if the detected period is in a predetermined period range and an average period computing circuit for computing an average period by utilizing a plurality of the time periods determined as normal by the period judging circuit, with the Doppler shift frequency obtained from the inverse value of the average period computed by the average period computing means.

According to the second feature of the invention, each of the requirements 1) through 4) aforementioned can be met. At first, it is impossible to use the method ① for tracking the frequency in order to meet the requirement 1) and it is necessary to use the pulse counting method ② or the period detecting method ③ therefor. With the requirement 3), it is the period detecting method ③ which is capable of improving detection precision in detecting Doppler shift frequency during a short measurement time. Accordingly, it will be sufficient if the other requirements 2) and 4) aforementioned are realized by the period detecting method ③. There is conceivable a block structure as shown in FIG. 6 as a period detecting method to meet the requirements. That is, when it is desired to count n pulses contained in an echo signal, the time to count n pulses is obtained based on a number of clock pulses counted by a counter 62 during a time period defined by a start pulse and an end pulse produced by a pulse generator 63 respectively at a leading edge and a trailing edge of one pulse obtained by dividing the frequency of the input signals by means of a n-frequency-divider 61, as shown in FIG. 7. However, with this circuit configuration, there is a possibility that pulses having abnormal periods mentioned in the requirement 4) are divided by the n-frequency-divider 61. Then, there is conceivable a circuit configuration as shown in FIG. 8 as a method for assuredly detecting the period of each pulse in the echo signal successively without interruption while satisfying the requirement 2). A counter 81 comprises a free running counter that continues to count up in response to count clock pulses. Assuming that the frequency of the count clock pulses is "fc" and the bit number of the counter 81 is k-bit, the counter repeats to counting up the clock pulses within a range of 0 to $(2^k - 1)$ and the count output will be signals obtained by dividing the count clock pulses by $2^1$ through $2^k$. Then, the Doppler shifted frequency for a water layer to be investigated is obtained by latching this count value by a latch circuit 82 at each leading edge of the echo signal, by successively writing the output signals of the latch circuit into different memory elements of a memory and the like at a given period while changing the address thereof and by reading the data from memory elements having addresses that correspond to the width of a layer to be investigated, in such an order from a start depth to an end depth thereof. With this circuit configuration, as shown in FIG. 9, assuming that the count value latched at the leading edge of the first pulse contained in an echo signal is "$X_1$" and a latch output resulting from the next one pulse is "$X_2$", the time period between these two pulses of the echo signal is expressed by the following expression:

$$\tau = (X_1 - X_2) \times \text{(period of clock pulses for counting)} = (X_1 - X_2)/fc \qquad (3)$$

The Doppler shifted frequency can be detected by calculating $1/\tau$. Thus, the Doppler shift frequency can be detected from one pulse of the echo signal, and one latch output is outputted every one pulse of the echo signal, so that the Doppler shifted frequency can be detected continuously from the time instant of the transmission of a search pulse and the Doppler shifted frequency can be obtained from echoes coming from any desired depth to be investigated without altering relevant hardwares.

On the other hand, the requirement 4) can be met by setting a frequency band corresponding to the period $\tau$ produced every one pulse in the echo signal and performing a judgement whether the period $\tau$ produced every one pulse is good or bad, since a frequency band for Doppler shifted frequencies can be predicted.

Furthermore, when a desired resolution cannot be obtained in detecting the frequency from the period of one pulse, the resolution of the detected frequency can be improved by obtaining an average period from detected period values of several pulses. The time required for detecting period values for several pulses contained in the echo signal is equivalent to a width for investigation beginning at a depth. Thus, any desired measurement width can be set by adjusting the measurement time. While, with the method as described in FIG. 6 for dividing pulses contained in the echo signal by "n", it can not be said that it is detected during a desired measurement time (measurement width), since the period of pulses in the echo signal itself is unknown, and thus a time required to detect n pulses is unknown and a width for measurement is also unknown.

Accordingly, the second feature of the present invention is that it measures the period of each pulse of the echo signal during a given time for measurement, determines whether the measured period is normal or not and then detects the Doppler shifted frequency based on a plurality of periods determined as normal in order to improve resolution in detecting the frequency.

BRIEF DESCRIPTION OF THE DRAWINGS

It should be noted that throughout the drawings, elements having like reference characters perform the same functions.

DETAILED DESCRIPTION OF THE DRAWINGS

Figure 1:
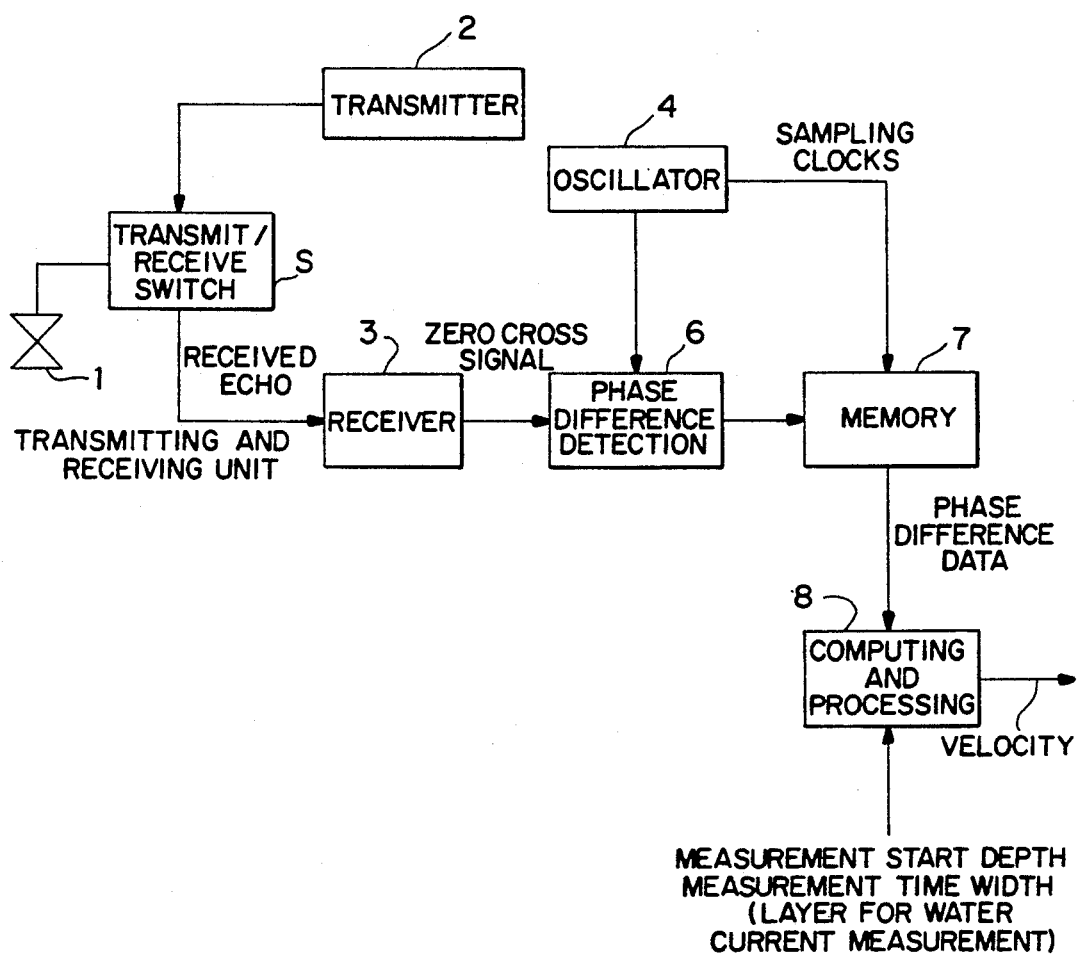
FIG. 1 is a block diagram of one preferred embodiment of an apparatus for measuring the velocity of a moving body in accordance with the present invention.

Firstly, there are explained cases for measuring the speed of a ship with respect to the water or with respect to the ground. An ultrasonic transmitting-and-receiving unit 1 radiates an ultrasonic wave pulse signal and receives echo signals generated at a depth or at the seabed. A transmitter 2 outputs transmission electric power to be applied to the ultrasonic transmitting-and-receiving unit 1 to emit an ultrasonic pulse signal from the unit 1. A transmit/receive switch S switches to derive transmission signals or reception signals. A receiver 3 converts the echo signals caught by the ultrasonic transmitting-and-receiving unit 1 to signals in a desired frequency band to limit the frequency band and detects zero crosses of the received echo signals to output the received echo signals as zero cross signals in a rectangular waveform. An oscillator 4 produces reference clock signals. A phase difference detector 6 detects phase differences between the phase of zero cross signals supplied from the receiver 3 and that of the reference signals supplied from the oscillator 4. A memory 7 latches the phase difference data outputted from the phase difference detector 6 in response to sampling clock pulses supplied from the oscillator 4. A computing and processing unit 8 implements trigonometric function transformation on the sampled phase difference data supplied from the memory 7, detects Doppler shift frequencies of echo signals generated at a depth or at the seabed and computes the speed of the ship with respect to the water or with respect to the ground based on detected Doppler frequency shifts in accordance with the equation (1').

Figure 2:
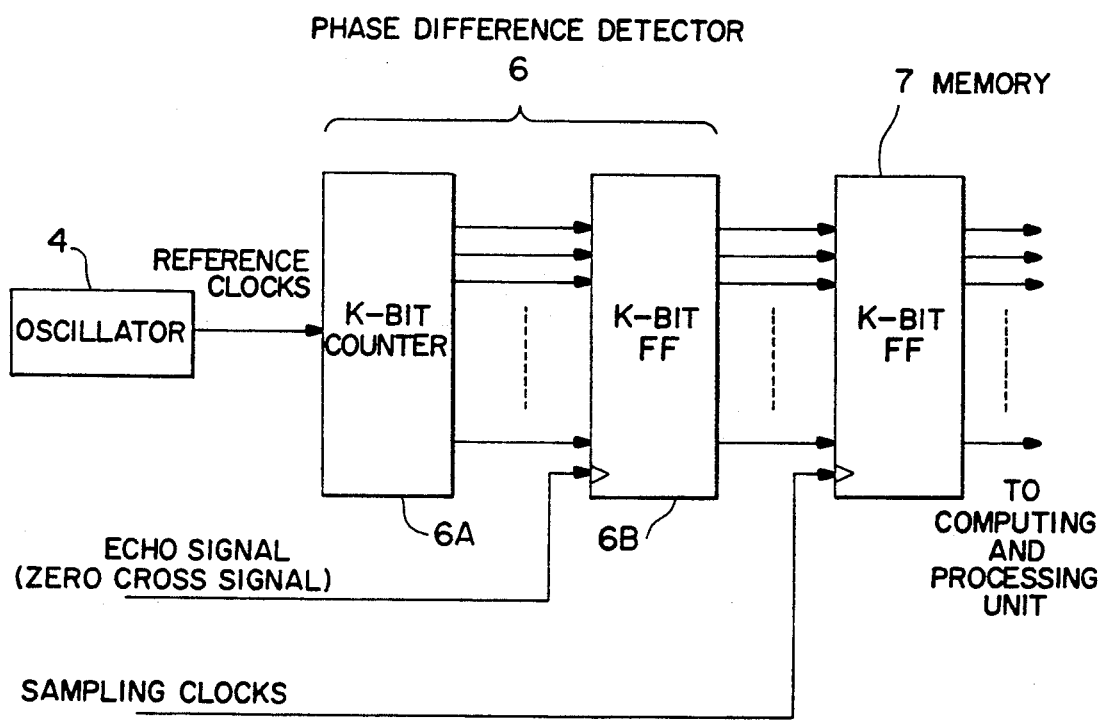
FIG. 2 is a block diagram showing a detailed structure of the main part of the apparatus in FIG. 1.

FIG. 2 shows an example of a detailed construction of the oscillator 4 through the memory 7, wherein the phase difference detector 6 is comprised of a k-bit free running counter 6A and a k-bit flip-flop circuit 6B, and the memory 7 is comprised of a k-bit flip-flop circuit.

Figure 3:
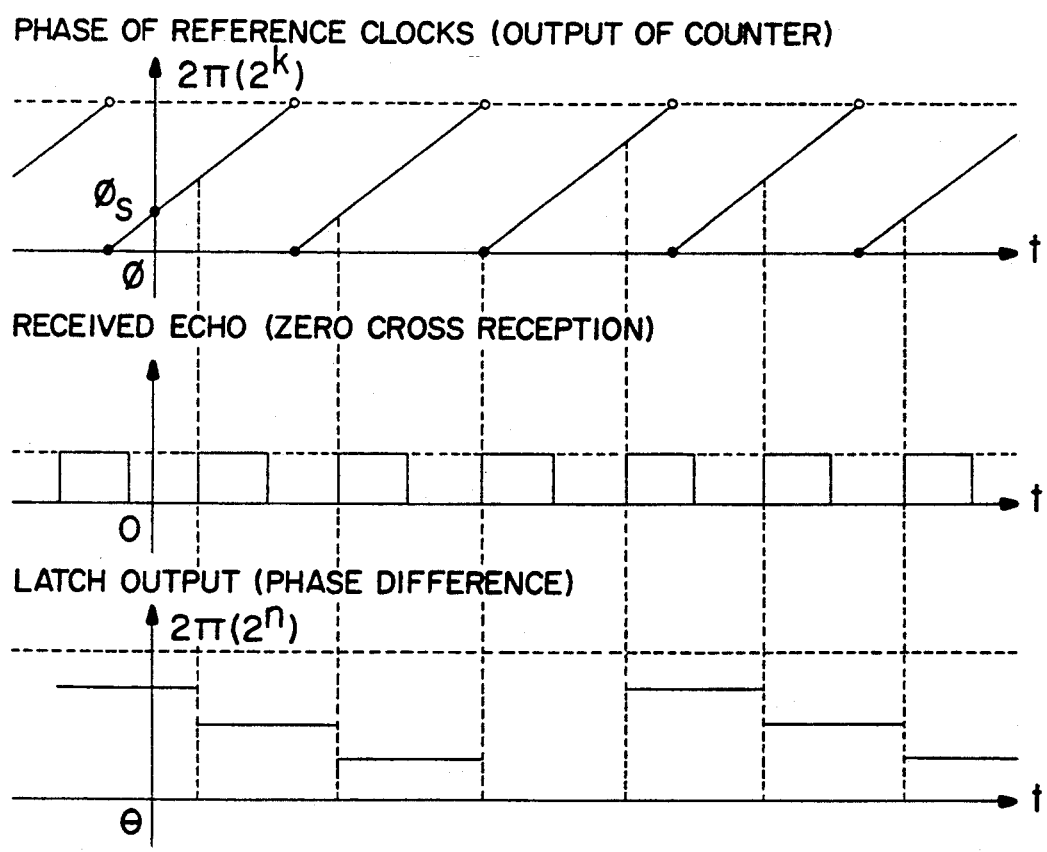
FIG. 3 is a time chart for explaining operations of the apparatus in FIG. 1.

Referring now to FIGS. 1, 2 and 3, operation of the preferred embodiment of the present invention will be explained.

When an ultrasonic pulse signal is transmitted from the transmitting-and-receiving unit 1, and echo signals resulting therefrom are received by the unit 1 and are supplied to the receiver 3 through the transmit/receive selector S, zero cross signals corresponding to the echo signals are generated by the receiver 3 and are supplied to the phase difference detector 6, as shown in FIG. 3(B). While, the k-bit counter 6A repeats counting up operation within a range of 0 through $(2^k-1)$ as shown in FIG. 3A, and an output from the k-bit counter 6A will be the phase of the signals obtained by dividing the reference clock pulses by $2^k$ and is expressed by a step of $2\pi/2k$. The k-bit flip-flop circuit 6B of the phase difference detector 6 latches the signal outputted from the k-bit counter 6A every one period of the zero cross signal, so that a latch signal outputted from the phase difference detector 6 will be a phase difference of signals between signals obtained by dividing the reference clock pulses by $2^k$ and the zero cross signals as shown in FIG. 3C. The phase difference signal sent out of the phase difference detector 6 is written into and stored in the memory 7.

It is assumed that the phase $\theta p(t)$ of the signal obtained by dividing the reference clock pulses by $2^k$ is expressed by the following equation:

$$\theta p(t) = 2\pi f p t + \phi po \qquad (4)$$

It is assumed that the phase $\theta e(t)$ of the zero cross signals in echo signals is expressed by the following equation:

$$\theta e(t) = 2\pi f d t + \phi do \qquad (5)$$

A value outputted from the phase difference detector 6 will be expressed by the following expression:

$$\begin{aligned} \Delta\theta(t) &= \theta p(t) - \theta e(t) \\ &= 2\pi(fp - fd)t + \Delta\theta p(t) \end{aligned} \qquad (6)$$

Thus, quantized values $\Delta\theta w(t)$ and $\Delta\theta g(t)$ of phase differences of the echo signals generated in the water and at the seabed with respect to the reference clocks can be obtained respectively.

When those values are inputted to the computing and processing unit 8, the unit 8 detects Doppler shift frequencies of echo signals generated at a depth or at the seabed in accordance with the aforementioned frequency determination method using FFT and computes the speed of the ship with respect to the water or with respect to the ground based on the detected Doppler frequency shifts in accordance with the equation (1').

In this case, if a start depth and a time width for measurement have been inputted to the computing and processing unit 8 in advance, the aforementioned phase difference data $\Delta\theta w(t)$ and $\Delta\theta g(t)$ corresponding to those input data are obtained, and trigonometric function transformation is implemented on those data within the measurement time so that data are successively produced in a time divisional fashion. The series of data time-sequentially produced are Fourier-transformed and a frequency interpolation is implemented after multiplying the series of data by the Hanning window to determine the frequency.

Next, the Doppler frequency shift can be computed in accordance with an equation:

Doppler frequency shift = (Frequency obtained by dividing the reference clock frequency by $2^k$) − (Detected Doppler shift frequency)

The speed of the own with respect to the ground or with respect to the water is obtained in accordance with the equation (1') by utilizing the computed frequency.

The computing and processing unit 8 also computes the speed of a water current at any desired depth in accordance with an equation:

Velocity of water current = (Ship's speed with respect to the ground) − (Ship's speed with respect to the water)

Figure 7:
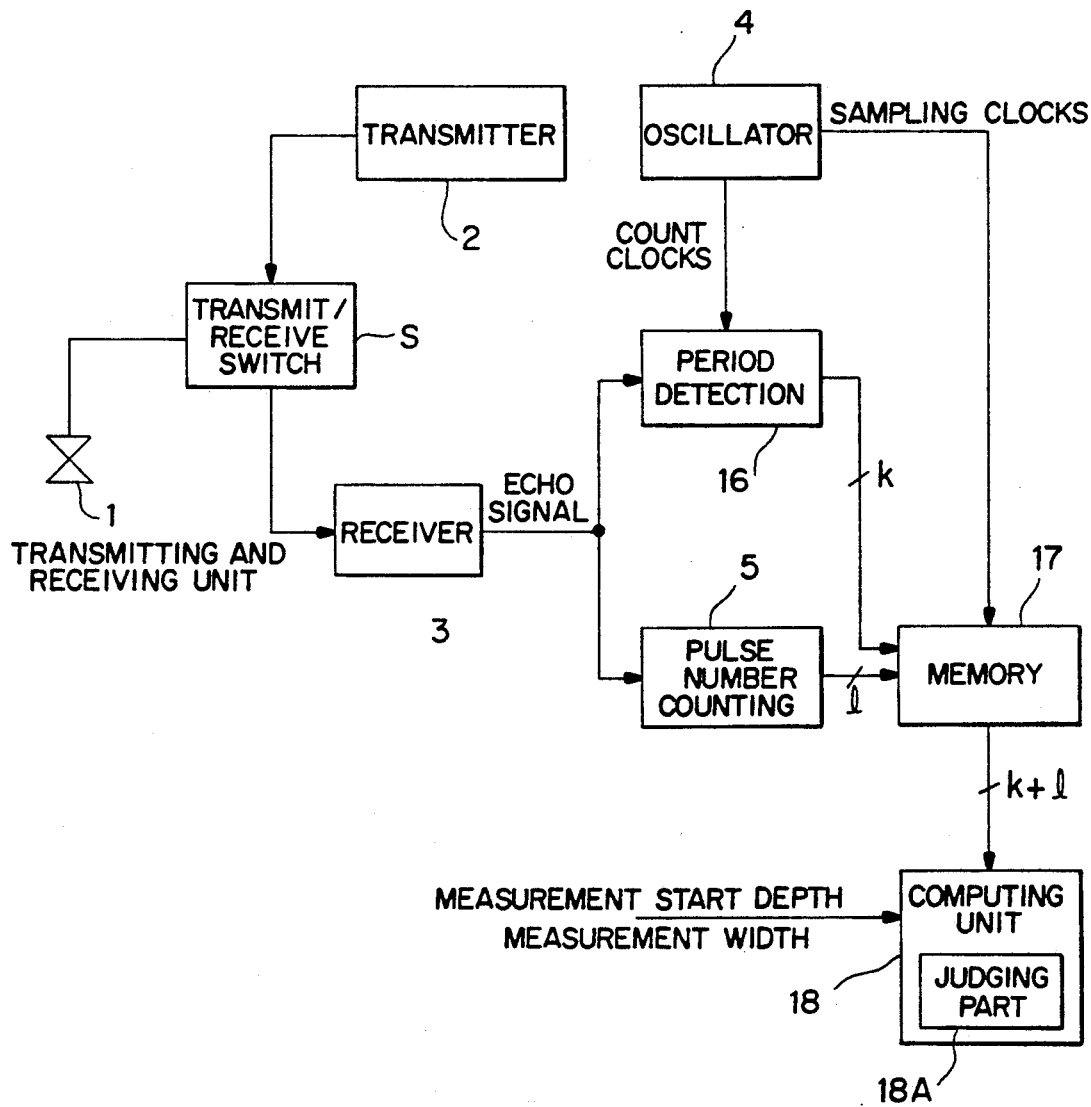
FIG. 7 is a block diagram of one preferred embodiment of an apparatus for measuring the velocity of a moving body according to the present invention.
Figure 8:
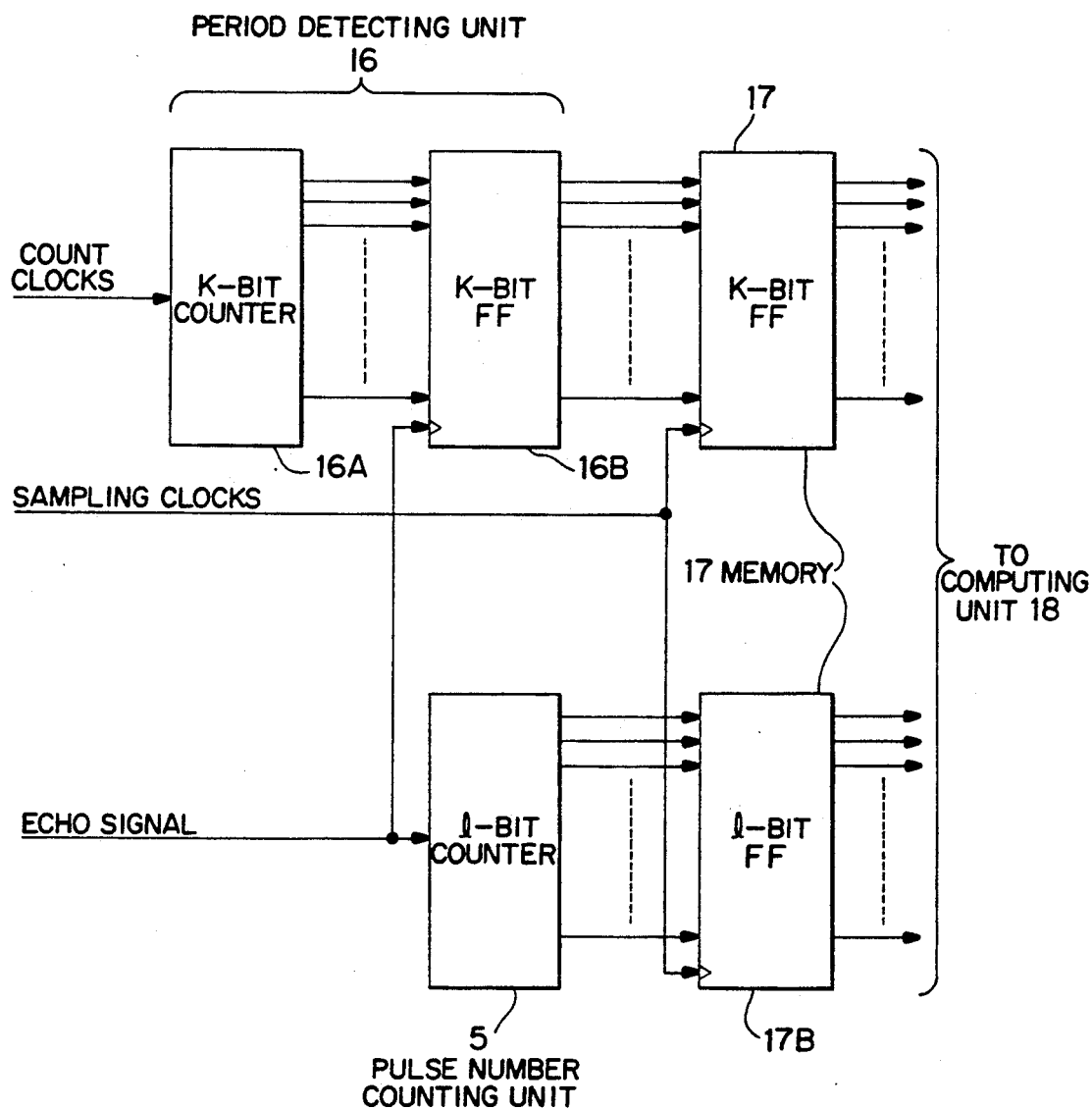
FIG. 8 is a block diagram showing a detailed structure of main parts of the apparatus in FIG. 7.
Figure 9:
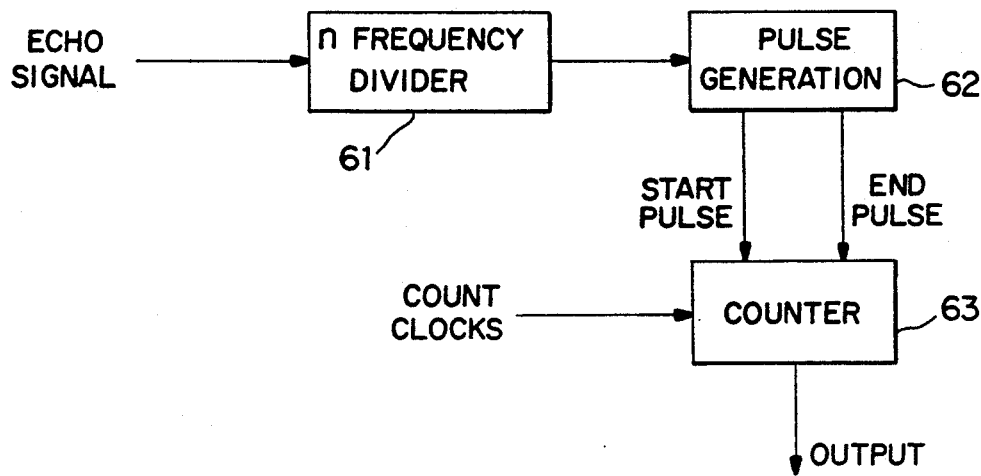
FIG. 9 is a block diagram of a period detecting circuit.
Figure 10:
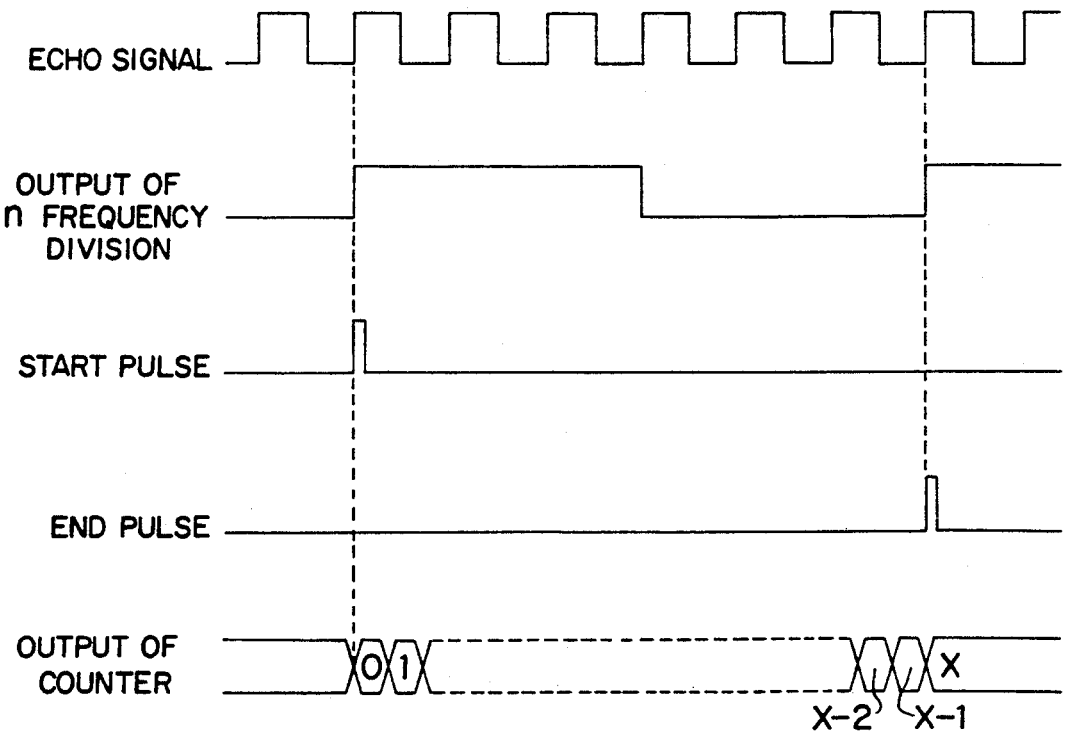
FIG. 10 is a time chart for explaining operations of the block diagram in FIG. 9.
Figure 11:
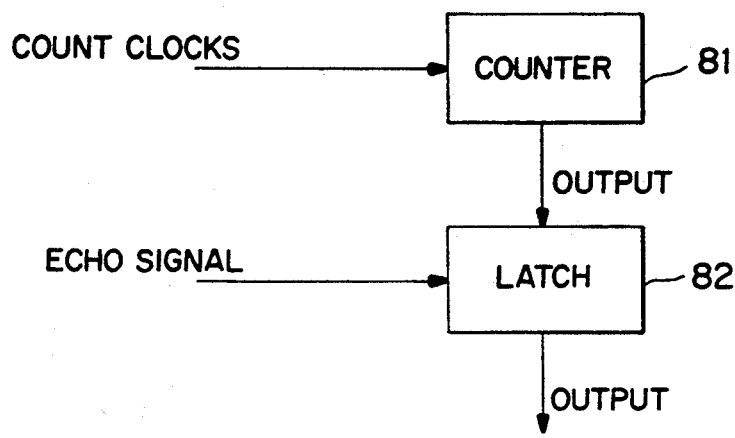
FIG. 11 is a block diagram of a period detecting circuit obtained by improving the period detection in FIG. 10.
Figure 12:
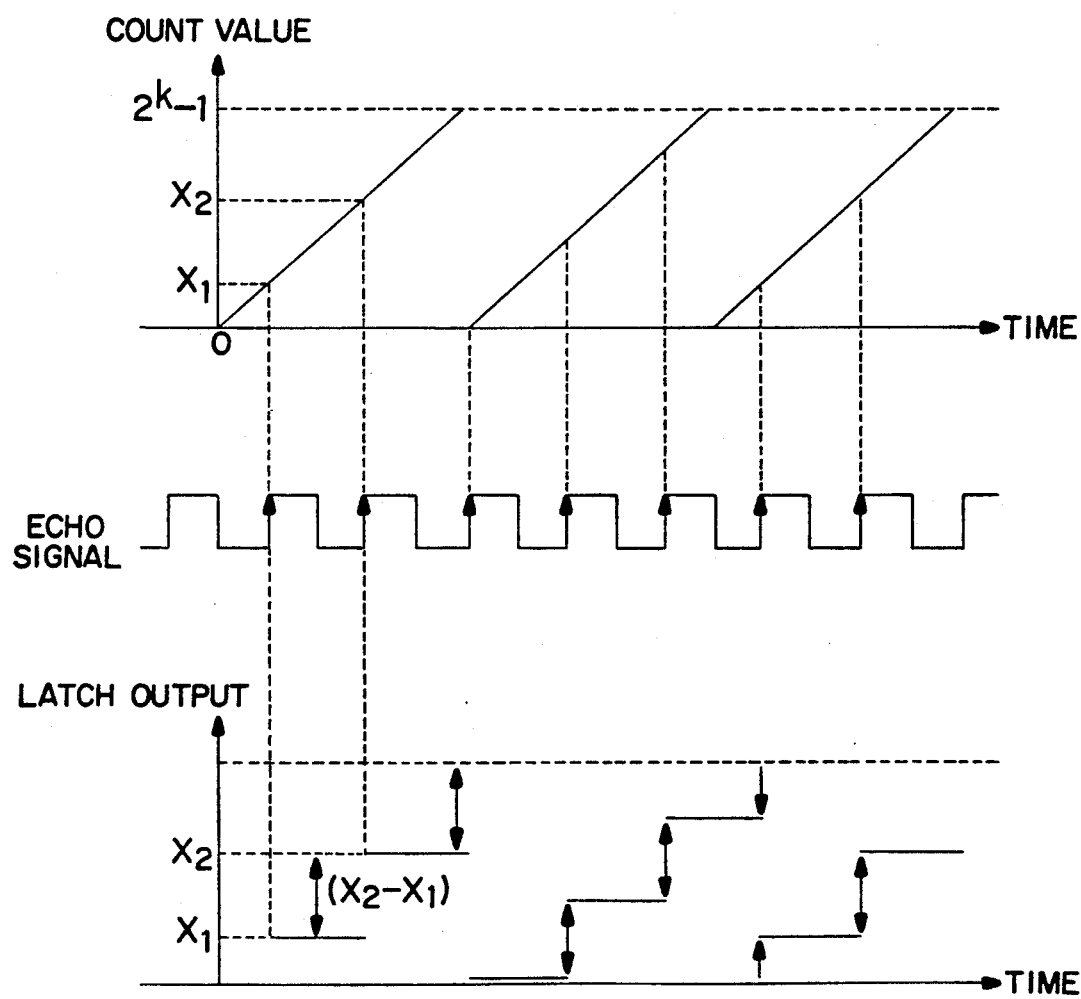
FIG. 12 is a time chart for explaining operations of the block diagram in FIG. 11.

Referring now to FIGS. 7 and 8, there will be explained another preferred embodiment of an apparatus for measuring the velocity of moving bodies in accordance with the present invention.

Figure 4:
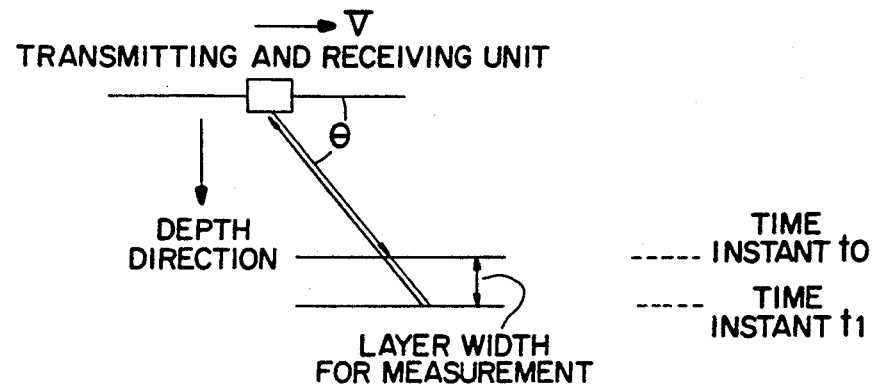
FIG. 4 is a schematic view for explaining a method for measuring the speed of a ship.
Figure 5:
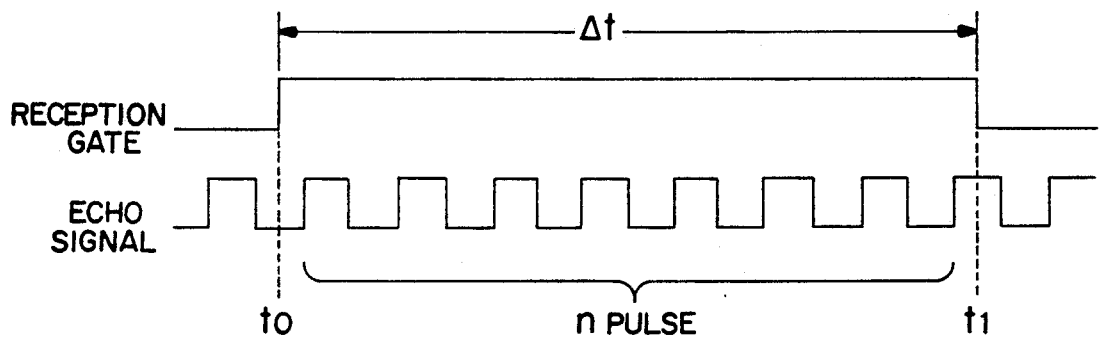
FIGS. 5 and 6 are time charts for explaining operations of a pulse counting method and a period detecting method respectively used for detecting a Doppler shifted frequency in an echo signal.
Figure 6:
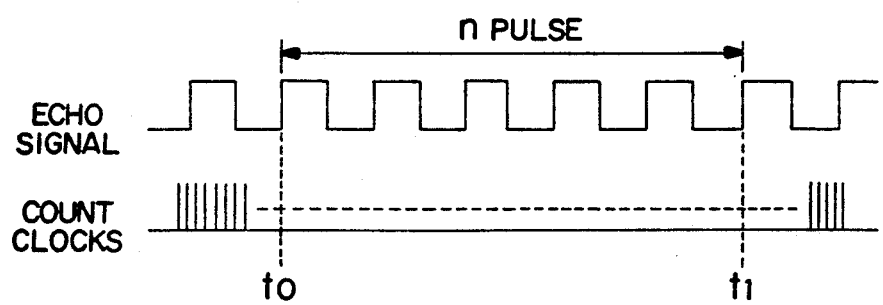

An ultrasonic transmitting-and-receiving unit 1 radiates an ultrasonic pulse signal and receives echo signals resulting therefrom. A transmitter 2 outputs transmission electric power to be applied to the ultrasonic transmitting-and-receiving unit 1. A receiver 3 amplifies received echo signals supplied from the transmitting-and-receiving unit 1. A transmit/receive switch S switches to derive transmission signals or reception signals. A period detecting unit 16 detects a period for each pulse of the echo signal outputted from the receiver 3. A pulse number counting unit 5 counts the number of the pulses in the echo signal. A memory 17 stores the period and the number of pulses outputted from the period detector 16 and the pulse number counting unit 5. An oscillator 4 outputs count clock pulses and sampling clock pulses to the period detector 16 and the memory 17 respectively. A computing unit 18 finds the period based on the data read out from the memory 17, with a measurement starting depth (time "t0" in FIG. 4) and a measurement width (time "t0" or "t1" in FIG. 4) set into the computing unit 18 to compute a Doppler frequency shift. The computing unit 18 is provided with a determining part 18A for determining whether the period found is normal or not.

FIG. 8 shows a detailed circuit diagram of the period detector 16, the pulse number counting unit 5 and the memory 17. The period detecting unit 16 is comprised of a k-bit counter 16A and a k-bit flip-flop circuit 16B. The pulse number counting unit 5 is comprised of an l-bit counter. The memory 17 is comprised of a k-bit flip-flop circuit 17A and an l-bit flip-flop circuit 17B.

Referring now to FIGS. 7 and 8, operation of the preferred embodiment of the present invention described therein will be explained.

When an ultrasonic signal is emitted from the transmitting-and-receiving unit 1 and echo signals resulting therefrom are detected by the unit 1 and an echo signal is outputted from the receiver, the period of each pulse of the echo signal is detected by the period detector 16 based on the counting clocks and the number of pulses of the echo signal is counted by the pulse number counting unit 5. These detected period and number of pulses are taken into the memory 17 based on the sampling clocks, sent out to the computing unit 18 and the following sampled outputs are inputted to the computing unit 18:

| Sampling Output of the Oscillator 4: | Sampling Output of the Pulse Number Counting Unit 5: |
|---|---|
| $x_{i-2}$ | $y_{i-2}$ |
| $x_{i-1}$ | $y_{i-1}$ |
| $x_i$ | $y_i$ |

-continued

| Sampling Output of the Oscillator 4: | Sampling Output of the Pulse Number Counting Unit 5: |
|---|---|
| $x_{i+1}$ | $y_{i+1}$ |
| $x_{i+2}$ | $y_{i+2}$ |
| . | . |
| . | . |
| . | . |
| $x_{j-2}$ | $y_{j-2}$ |
| $x_{j-1}$ | $y_{j-2}$ |
| $x_j$ | $y_j$ |
| $x_{j+1}$ | $y_{j+1}$ |
| . | . |
| . | . |
| . | . |

With the series of the data above, assuming that $x_i$ and $y_i$ are data at a time that corresponds to the measurement start depth (corresponding to time "t0"), and $x_j$ and $y_j$ are data at a time that corresponds to the measurement end depth (corresponding to time "ti"), $x_i$ through $x_j$ from the period detector 16 and $y_i$ through $y_j$ from the pulse number counting unit 5 will be the data within the measurement width (measurement time). Accordingly, the time width $\Delta x_m$ of the pulses and the number of counted pulses $\Delta y_m$ within the above sampling period can be expressed by the following expressions:

$$\Delta x_m = (x_{m+1} - x_m)/f_c$$
$$\Delta y_m = (y_{m+1} - y_m) \qquad (7)$$

where, "fc" is the frequency of the count clocks. Thus, when the sum of each of the above expression is taken in the above measurement time, the total pulse number Y in the measurement time and the time X needed for the total pulse number can be obtained.

$$Y = \Sigma(y_{m+1} - y_m)$$
$$X = \Sigma(x_{m+1} - x_m)/f_c \qquad (8)$$

Based on the equations, an average frequency "f" within the measurement time can be obtained by $f = Y/X$. But as explained in the foregoing, if the data obtained in accordance with the equation (7) are directly used, data of abnormal periods will be included. In order to solve the problem, the following processing is carried out in the computing unit 18.

With apparatuses of this kind, the speed detecting range is normally set by specification, so that a frequency band width for echo signals with its frequency being Doppler shifted can be determined. Thus, a range of the period of pulse can be set from the frequency band width. Moreover, since a speed of a ship and the like is rarely changed abruptly, so that a certain range can be set for the fluctuation of the speed of a ship i.e., for fluctuationable amounts of the Doppler shift frequency and the period. From that, by having set a range of normal period range $\Delta \tau_{min} \sim \Delta \tau_{max}$ into the computing unit 18, the detected period can be determined as resulting from a normal pulse or not by judging whether an instantaneous period $\Delta \tau$ ($= \Delta x_m/y_m$) for one pulse of the echo signal obtained in accordance with the equation (7) satisfies the following Expression (9).

$$\Delta \tau_{min} \leq \Delta \tau \leq \Delta \tau_{max} \qquad (9)$$

In this way, the above judgment is carried out for each one pulse and the sums X' and Y' of respective $\Delta x_m$ and $\Delta y_m$ of normal periods are respectively obtained.

$$X' = \Sigma \Delta x_m$$
$$Y' = \Sigma \Delta y_m \qquad (10)$$

After that, an average Doppler shift frequency f can be obtained based on the normal periods in accordance with the following Expression (11):

$$f = Y'/X' \qquad (11)$$

It is to be noted that with Doppler sonars and water current flow meters, mainly a three-beam or a four-beam system is adopted to reduce influences caused by pitch, roll or yaw of a ship. With the arrangement shown in FIG. 7, when the number of the beams is increased, only the period detector 16 and the pulse number counting unit 5 need to be provided for each beam, while with the frequency tracking method these detectors 16 and the unit 5 must be provided for each beam and each measurement layer. Thus, according to the present invention, the hardwares can be simplified and the number of parts can be decreased.

Figure 13:
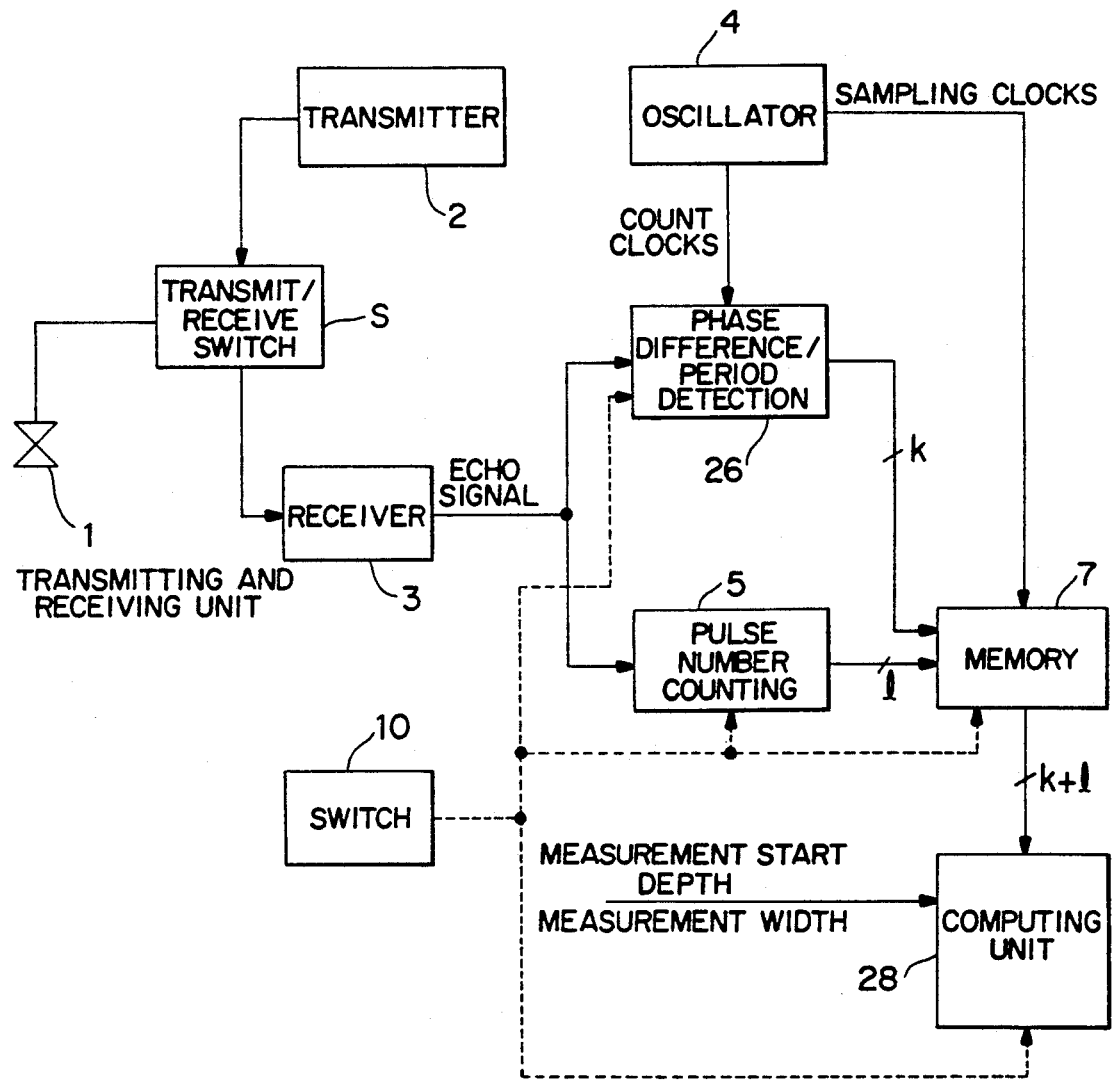
FIG. 13 is a block diagram of another preferred embodiment of the present invention.

Referring now to FIG. 13, another embodiment of the present invention will be explained.

This embodiment comprises a first speed detector for measuring the speed of a ship with respect to the water or with respect to the ground or the velocity of water currents using FFT as shown in FIG. 1, a second speed detector for detecting the speed of own ship with respect to the water or with respect to the seabed or the speed of water currents by obtaining the period of each pulse of a carrier signal contained in an echo signal as shown in FIG. 7 and a switching means, which selects, as desired to operate the first or second speed detectors for moving.

The first speed detector shown in FIG. 1 can be used even in an environment where S/N ratio is not so good and is capable of measuring the speed of the ship with respect to the water or with respect to the ground at a deep depth in the water. It needs a certain length of measurement time to detect a Doppler shift frequency. On the other hand, although it is not appropriate to use the second speed detector shown in FIG. 7 in an environment where S/N ratio is not so good, since it is influenced by noises, it has no restrictions in terms of the time for detecting the Doppler shift frequency. Thus, it fits in measuring the speed of the ship with respect to the water or with respect to the ground or the speed of a water current flow in shallow water. The selective use of the first or the second speed detector according to the environment enables a more accurate measurement of the speed of a ship with respect to the water or with respect to the ground or the speed of a water current flow regardless of the depth.

A phase detector/period detector 26 is comprised of a k-bit free running counter 6A or 16A and a k-bit flip-flop circuit 6B or 16B, as shown in FIGS. 2 or 8. A memory 17 is comprised of k-bit flip-flop circuits 17A and 17B as shown in FIG. 8. When the first speed detector is selected, a computing and processing unit 28 detects a Doppler shift frequency of an echo signal generated at a depth or at the seabed after implementing trigonometric function transformation on sampled phase difference data supplied from the flip-flop circuit 17A of the memory 17 as shown in Expression (2) and then computes the speed of the ship with respect to the water or with the ground based on the detected Doppler frequency shift in accordance with the equation (1') and further computes the speed of water current flows based on those speeds of the ship. Moreover, when the second speed detector is selected, the computing unit 28 finds the period based on data read out from the memory 17, computes a Doppler shift frequency, judges whether the period found is normal or not and computes the speed of the ship with respect to the water or with respect to the ground or the velocity of a water current. A switch 10 selects and operates either the first or the second speed detectors.

Firstly, there will be explained a case in which the first speed detector which uses FFT is selected by the switch 10 to obtain the speed of the ship with respect to the water or with respect to the ground or the speed of a water current.

When an ultrasonic pulse signal is transmitted from the transmitting-and-receiving unit 1, and echo signals resulting therefrom are caught by the unit 1 and inputted to the receiver 3 through the transmit/receive switch S, zero cross signals that correspond to the echo signals are generated in the receiver 3 and outputted as shown in FIG. 3B and are inputted to the phase difference/period detector 26. In this case, the phase difference/period detector 26 operates so as to detect a phase difference. On the other hand, the k-bit counters 6A and 16A repeat counting up in the range of 0 through $(2k-1)$ as shown in FIG. 3A. Outputs from the k-bit counters 6A and 16A will be phase of the signals obtained by dividing the reference clocks by $2^k$ in steps of $2\pi/2^k$. The k-bit flip-flop circuits 6B and 16B of the detector 26 latch the output signals from the k-bit counters 6A and 16A every one period of the zero cross signal, so that the latch signals outputted from the detector 26 will be signals representing phase differences between the signals obtained by dividing the reference clocks by $2^k$ and the zero cross signal, as shown in FIG. 3C. The phase difference signals sent out of the phase difference/period detector 26 are written into and stored in the memory 17. When quantized phase difference values $\Delta\theta w(t)$ and $\Delta\theta g(t)$ of the echo signals generated in the water or at the seabed with respect to the reference clock signals are inputted from the memory 17 to the computing and processing unit 28, the computing and processing unit 28 detects a Doppler shift frequency of the echo signal generated at a depth or at the seabed in accordance with the aforementioned frequency determination method using FFT and computes the speed of the ship with respect to the water or with respect to the ground based on the resultant Doppler frequency shift in accordance with the aforementioned Expression (1'). Moreover, it computes the speed of the water current based on those speeds with respect to the water or with respect to the ground. These operations are the same with the one performed with the embodiment shown in FIG. 1.

Next, there will be explained a case in which the switch 10 selects the second speed detector to measure the period of each pulse of the carrier signal contained in the echo signal to detect the Doppler shift frequency to obtain the speed of the ship with respect to the water or with respect to the ground or the speed of water currents.

In this case, the phase difference/period detector 26 detects the period of the signal. The computing unit 28 also finds the period of signals based on the data read out of the memory 17 and computes the Doppler shift frequency. When an ultrasonic signal is emitted from the transmitting-and-receiving unit 1, resultant echo signals are caught by the unit 1, and the echo signals are outputted from the receiver 3, the period of each pulse of the echo signal is detected by the phase difference/period detector 26 based on the count clocks and the number of pulses of the echo signal is counted by the pulse number counting unit 5. These detected period and number of pulses are taken into the memory 17 in response to sampling clocks and are sent out to the computing unit 28. The computing unit 28 computes the speed of the ship or of the water current based on the Doppler shift frequency detected. These operations are the same as the ones with the embodiment shown in FIG. 8.

Figure 14:
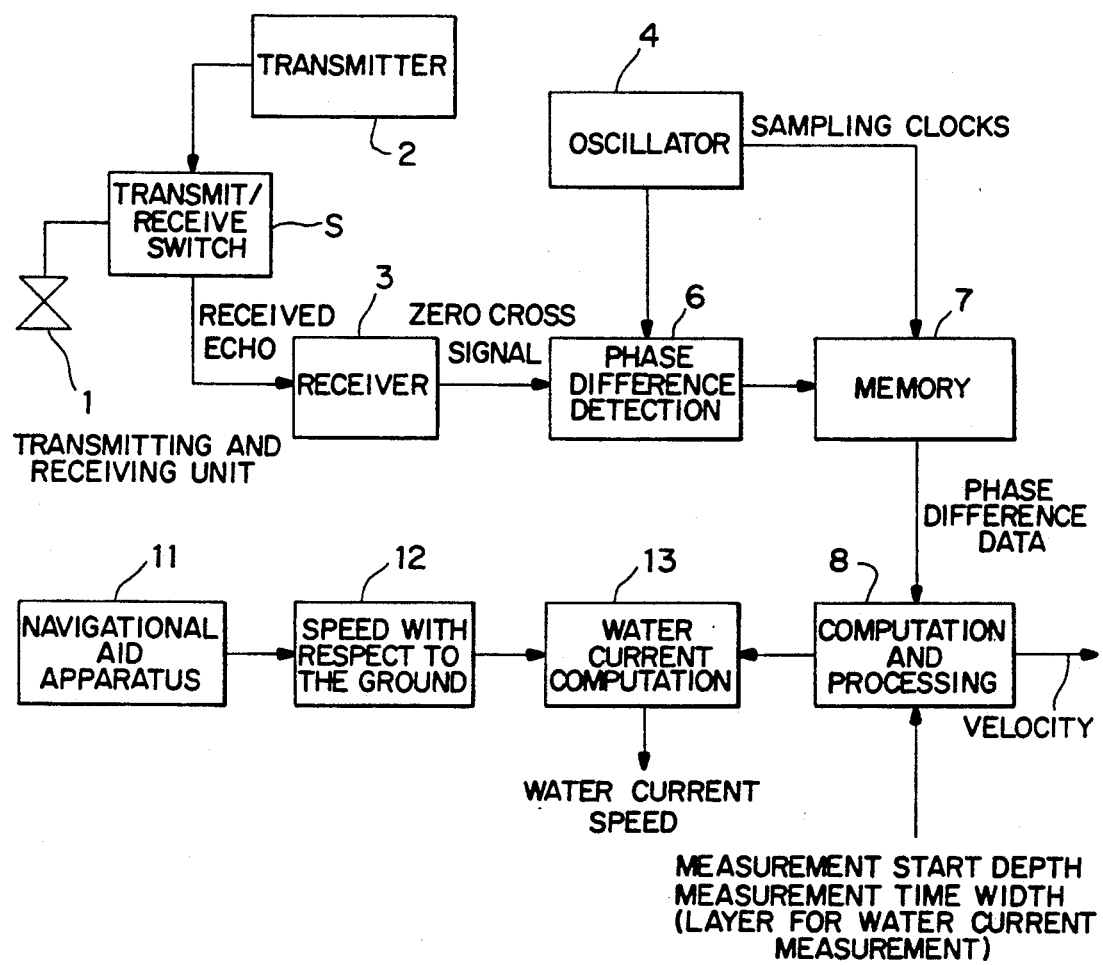
FIG. 14 is a block diagram of still another preferred embodiment of the present invention.

In FIG. 14, a navigation system 11 is comprised of, for example, a Loran receiver, measures the position of a point on the Earth, generates signals representing, for example, the longitude and latitude of the point and transmits the signals to a computing unit 12 for the ship's speed with respect to the ground. The computing unit 12 computes the speed of the ship with respect to the ground based on distances between at least two points and times necessary for the ship to travel between the two points and sends it to a water current computing unit 13. In FIG. 14, the construction of the other parts than the navigation system 11, the computing unit 12 for the ship's speed with respect to the ground and the water current computing unit 13 is the same as the one with the embodiment shown in FIG. 1. The computing and processing unit 8 supplies the speed of a ship with respect to the water at a depth or at a plurality of depths to the water current computing unit. The water current computing unit 13 computes and finds the speeds of water currents at one depth or at the plurality of depths based on the inputted ship speeds with respect to the ground and with respect to the water.

Although a navigational aid apparatus comprising a loran receiver is used in the embodiment shown in FIG. 14, a GPS receiver (Global Positioning System) can also be used to achieve the same object. The GPS receiver is capable of supplying a signal representing the speed of the ship with respect to the ground directly to the water current computing unit 13, so that in this case, the computing unit 12 for the ship's speed with respect to the ground becomes unnecessary.

It should be noted that in the same way as the embodiment shown in FIG. 14, if the navigation system 11, the computing unit 12 for the ship's speed with respect to the ground and the water current computing unit 13 are added to the arrangement of the embodiment shown in FIG. 7, and the water current computing unit 13 is supplied with the speed of ship with respect to the water from the computing unit 18 and also with the speed of ship with respect to the ground from the computing unit 12 for the ship's speed with respect to the ground, there can be measured the velocity of water currents at one depth or at a plurality of depths. Moreover, instead of using the navigation system 11 and the computing unit 12 for obtaining the ship's speed with respect to the ground, it is also possible to use a GPS receiver to directly send the signal representing the speed of the ship with respect to the ground to the water current computing unit 13, so that the velocities of water currents are obtained.

It should be noted that in the same way as the embodiment shown in FIG. 14, if the navigation system 11, the computing unit 12 for the ship's speed with respect to the ground and the water current computing unit 13 are added to the arrangement of the embodiment shown in FIG. 13, and the water current computing unit 13 is supplied with the speed of ship with respect to the water from the computing unit 28 and also with the speed of ship with respect to the ground from the computing unit 12 for the ship's speed with respect to the ground, there can be measured the velocity of water currents at one depth or at a plurality of depths, even when either one of the first or the second speed detectors is selected. Moreover, instead of using the navigation system 11 and the computing unit 12 for obtaining the ship's speed with respect to the ground, it is also possible to use a GPS receiver to directly sending the signal representing the speed of the ship with respect to the ground to the water current computing unit 13, so that the velocity of water currents are obtained.

There will be explained a feature of the present invention for further improving the performance of the embodiments employing the method for determining the Doppler shift frequency using FFT described in FIGS. 1, 13 or 14.

With regard to the method for determining the Doppler shift frequency using FFT employed in the embodiments described in FIGS. 1, 13 or 14, the maximum amplitude needs to be detected from the spectrum of detected data obtained by Fourier transformation. Although spectrum of white noise shows, theoretically, a constant value in any frequency component, in reality, the signals obtained by Fourier-transforming the time series data of the noise do not necessarily show a constant value and the value of the data varies within a certain range. If an amplitude value caused by dispersion of the spectrum component due to noise becomes larger than the amplitude of the signal when a time series data with low S/N ratio is Fourier-transformed, a large error is generated in a detected frequency. Although the maximum amplitude in the signal frequency may be easily detected if a plurality of detected signals are averaged on a frequency axis to avoid this problem, the average processing cannot be implemented on the frequency axis as it is because the Doppler shift frequency changes every time when transmitted and received due to a fluctuation of a ship even if it sails at a constant speed (because constancy cannot be assumed with the signal frequency). In fact, echo signals (with respect to the water) reflected by the seabed or a water body such as planktons and the like are very weak and a signal having high S/N ratio cannot be expected. Thus, it will be a problem to measure the frequency of signals having low S/N ratio with high precision.

There will be explained a method for averaging echo signals reflected at a depth in the water (not by the seabed) having low S/N ratio on the frequency axis.

To find the speed of a ship with respect to the water/ground is to find the Doppler frequency shift in the expression (1'). When the phase of echo signals reflected by the ground or by a body of water at a time instant "t" is expressed as $\theta e(t)$, signals R(t) and I(t) which are obtained by implementing a trigonometric function transformation on the phase are as follows:

$$R(t) = \cos \theta e(t)$$

$$I(t) = \sin \theta e(t)$$

The Doppler shift frequency can be determined by Fourier-transforming these signals as time series data in accordance with the aforementioned "High Precision Frequency Determination Method using FFT". That is, the Doppler shift frequency is determined by quantizing the phase $\theta$, instead of quantizing the amplitude of the R and I components. Although only a relative value can be obtained since the amplitude information is normalized, it is not a problem, since the object here is to find the frequency.

On the other hand, the speed of a water current flow is obtained by taking a difference between the ship's speed with respect to the ground and the ship's speed with respect to the water. Expressing the ship's speed with respect to the ground as "Vg" and the ship's speed with respect to the water as "Vw", the speed of the water current flow "Vc" will be Vc=Vg−Vw. Also expressing the Doppler shift of echo signals reflected by the ground as "fdg" and the Doppler shift of echo signals reflected by a body of water as "fdw", the Doppler shift due to the water current "fdc" can be obtained in the same way from an equation fdc=fdg−fdw. Moreover, since the water current flow is considered to be almost constant in a spectrum average time, it becomes possible to average on the frequency axis if a Doppler spectrum due to a speed component of the water current can be found.

Next, a method how to implement the above will be considered. Normally, as a technique for quantizing to obtain a time series data which are necessary for Fourier transformation, an A/D converter is used. However, it is difficult to obtain the Doppler spectrum due to the water current speed component simply just by quantizing the amplitude of the time series data according to this technique. Then, the following technique comes up to be used.

The frequency can be given by time differentiating the phase. Expressing that the phases of the echo signals reflected by the ground and of the echo signals reflected by a body of water at a time instant "t" as $\theta g(t)$ and $\theta w(t)$ respectively, the phase of the water current is expressed as $\theta c(t)$ with the initial phase expressed as $\theta co$. When it is trigonometric-function-transformed, it becomes as follows:

$$\cos \theta c(t) = \cos(\theta g(t) - \theta w(t) + \theta co)$$

$$\sin \theta c(t) = \sin(\theta g(t) - \theta w(t) + \theta co) \quad (12)$$

Then, the Doppler spectrum of the water current can be obtained by implementing Fourier transformation in accordance with the aforementioned "High Precision Frequency Determination Method Using FFT" in the same way as above.

A water current measurement layer and a start depth and a time width for measuring the speed of the ship with respect to the ground are inputted beforehand when the water current speed is desired to be measured. The aforementioned phase difference data $\Delta\theta w(t)$ and $\Delta\theta g(t)$ that correspond to these set data can be found, and the phase difference quantized value by the current $\Delta\theta c(t)$ can be obtained by implementing subtraction on those quantized phase difference values of $\Delta\theta w(t)$ and $\Delta\theta g(t)$ resulting from echoe signals reflected by a body of water or by the ground as shown by the following expression:

$$\Delta\theta c(t) = \Delta\theta w(t) - \Delta\theta g(t)$$
$$= \{2\pi(fp - fdw) + \Delta\theta o\} -$$
$$\{2\pi(fp - fdg) + \Delta\theta gw\}$$
$$= 2\pi(fdg - fdw) + \Delta\theta co$$

(13)

The phase difference data found is given the trigonometric function transformation to obtain a time series data. Then, in the same way, the data is multiplied by the Hanning window, and Fourier transformation is implemented on the data. Fourier power spectra resulting from a few transmissions and receptions obtained in this way are averaged, and the frequency is determined by the "High Precision Frequency Determination Method Using FFT". This value is the Doppler shift frequency and the water current speed is obtained based on this value.

Although the present invention has been described in detail as described above and in connection with the several embodiments, it is understood that to those skilled in the art, various other embodiments and modifications of the embodiments described above can be easily created without deviating from the technical idea and scope of the present invention.

EFFECTS OF THE INVENTION

As described above, the present invention is, as a first feature thereof, capable of producing the following effects by applying the high precision frequency determination method using Fourier transformation:

the speed can be detected in real time;

a frequency can be detected with high precision even when the thickness of a measurement layer (measurement time width) is small and resolution in the depth direction can be improved; and accuracy in detecting a frequency (or speed) from signals having low S/N ratio can be evaluated quantitively using equations.

Furthermore, the use of the phase difference detecting method as pre-processing prior to the Fourier transformation allows to obtain the following advantages:

phase data of a Doppler shift frequency due to a water current can be quantized directly from a phase difference between the reference clocks and echo signals reflected by the ground or by a water body and spectra can be averaged;

the phase data can be obtained from zero cross signals in the same manner as the conventional frequency detecting method and frequency tracking method using zero cross signals, and the performance of the conventional systems can be improved; and although the amplitude information is normalized as compared to a typical A/D conversion method, a dynamic range can be always kept in an ideal condition and analog processing can be simplified since a zero cross detector is used.

Further, the present invention is, as a second feature thereof, capable of improving detecting accuracy by detecting the period per each pulse of the echo signal and taking only normal ones among those periods found to remove abnormal period. The present invention is further capable of improving the detecting accuracy by obtaining the Doppler shift frequency from a plurality of the normal periods.

We claim:

1. An apparatus for measuring a speed of a ship with respect to the ground and a speed of the ship with respect to water and determining a velocity of a water current comprising:

speed means for measuring a position of at least two points on the Earth and a time required to travel between the two points and for obtaining the speed of the ship with respect to the ground based on the measured positions and time;

transmitting means for transmitting ultrasonic signals into the water;

phase difference detecting means for detecting a phase difference between a reference signal and received echo signals generated at a depth;

Fourier means for implementing a Fourier transformation signals resulting from on the phase difference data obtained by said phase difference detecting means and for computing the speed of a ship with respect to the water at the depth based on Fourier spectrum data obtained from the Fourier transformation; and velocity means for computing the velocity of the water current at the depth based on the speed of a ship with respect to the ground and the speed of the ship with respect to the water.

2. An apparatus for measuring a speed of a ship with respect to the ground and a speed of the ship with respect to water and determining a velocity of a water current based on the speeds of the ship comprising:

speed means for measuring a position of at least two points on the Earth and a time required to travel between the two points and for obtaining the speed of the ship with respect to the ground based on the measured positions and time;

transmitting means for transmitting ultrasonic signals into the water;

phase difference detecting means for detecting a phase difference between a reference signal and received echo signals generated at a plurality of depths;

Fourier means for implementing Fourier transformations on signals resulting from the phase difference data obtained by said phase difference detecting means and for computing the speed of a ship with respect to the water at the plurality of the depths based on Fourier spectra data obtained from the Fourier transformation; and velocity means for computing the velocity of water currents at the plurality of the depths based on the speed of the ship with respect to the ground and the speeds of the ship with respect to the water at the plurality of depths.

3. An apparatus for measuring a Doppler frequency shift comprising:

period detecting means for detecting a period for each pulse in the echo signals during a given measurement time;

period judging means for determining whether the period detected by said period detecting means is in a normal period range;

average period computing means for computing an average period from a plurality of periods which are judged as normal by said period judging means; and inverse means for obtaining a Doppler shift frequency from an inverse value of the average period obtained by said average period computing means.

4. An apparatus for measuring a speed of a ship by detecting a Doppler shift frequency generated with ultrasonic echo signals propagating in the water comprising:

period detecting means for detecting a period for each pulse in the echo signals during a given measurement time;

period judging means for determining whether the period detected by said period detecting means is in a normal period range;

average period computing means for computing an average period from a plurality of periods which are judged as normal by said period judging means;

inverse means for obtaining a Doppler shift frequency from an inverse value of the average period obtained by said average period computing means; and speed computing means for computing the speed of the ship based on the obtained Doppler shift frequency.

5. The apparatus as claimed in claim 4 wherein said speed computing means computes the speed of the ship with respect to water.

6. The apparatus as claimed in claim 4 wherein said speed computing means computes the speed of the ship with respect to a seabed.

7. An apparatus for determining a velocity of a water current by detecting a Doppler shift frequency generated with ultrasonic echo signals propagating in the water comprising:

period detecting means for detecting a period for each pulse in received echo signals generated at a seabed and in water during a given measurement time;

period judging means for determining whether a period detected by said period detecting means is in a normal period range;

average period computing means for computing an average period from a plurality of periods which are judged as normal by said period judging means;

inverse means for obtaining a Doppler shift frequency from an inverse value of the average period obtained by said average period computing means;

speed computing means for computing a speed of a ship with respect to the seabed and the speed of the ship with respect to the water based on the obtained Doppler shift frequency; and water current velocity computing means for computing the velocity of the water current at a depth at which the echo signals are generated based on the speed of the ship with respect to the seabed and the speed of the ship with respect to the water.

8. The apparatus as claimed in claim 7 wherein said water current velocity computing means computes speeds of water currents at a plurality of depths.

9. An apparatus for measuring a speed of a ship with respect to the ground and the speed of the ship with respect to water and determines a velocity of a water current on the speeds of the ship comprising:

speed means for measuring a position of at least two points on the Earth and a time required to travel between the two points and for obtaining the speed of a ship with respect to the ground based on the measured positions and time;

period detecting means for detecting a period for each pulse in received echo signals generated in the water during a given measurement time;

period judging means for determining whether a period detected by said period detecting means is in a normal period range;

average period computing means for computing an average period from a plurality of periods which are judged as normal by said period judging means;

inverse means for obtaining a Doppler shift frequency from an inverse value of the average period obtained by said average period computing means;

speed computing means for computing the speed of the ship with respect to the water based on the obtained Doppler shift frequency; and water current velocity computing means for computing the velocity of the water current at the a depth at which the echo signals are generated based on the speed of the ship with respect to the ground and the speed of the ship with respect to the water.

10. The apparatus as claimed in claim 9 wherein said water current velocity computing means computes speeds of water currents at a plurality of depths.

11. A system for determining a velocity of a water current by detecting a Doppler shift frequency generated with ultrasonic echo signals propagating in water comprising:

a first apparatus for measuring the speed of a moving body;

said first apparatus including, phase difference detecting means for detecting a phase difference between a reference signal and received echo signals generated at a seabed and in the water, first computing means for implementing Fourier transformations on signals resulting from the phase difference data obtained by said phase difference detecting means and for computing speed of a ship with respect to the seabed and the speed of the ship with respect to the water based on Fourier spectrum data obtained from the Fourier transformation, and second computing means for determining the velocity of a water current at a depth at which the ultrasonic echo signals are generated based on the speed of the ship with respect to the ground and the speed of the ship with respect to the water;

a second apparatus for measuring the speed of a moving body;

said second apparatus including, period detecting means for detecting a period for each pulse in received echo signal generated at the seabed and in the water during a given measurement time, period judging means for determining whether a period detected by said period detecting means is in a normal period range, average period computing means for computing an average period from a plurality of periods which are judged as normal by said period judging means, inverse means for obtaining a Doppler shift frequency from an inverse value of the average period obtained by said average period computing means, speed computing means for computing the speed of the ship with respect to the ground and the speed of the ship with respect to the water based on the obtained Doppler shift frequency, and water current velocity computing means for computing the velocity of the water current at the depth at which the echo signals are generated based on the speed of the ship with respect to the water obtained from said speed computing means; and switching means for selecting said first apparatus for measuring the speed of a moving body or said second apparatus for measuring the speed of a moving body.

12. An apparatus for measuring a speed of a ship with respect to water and the speed of the ship with respect to ground and determines a velocity of water current based on the speeds of the ship comprising:

navigational means for measuring the speed of the ship with respect to the ground using navigational data;

transmitting means for transmitting ultrasonic signals into the water;

phase difference detecting means for detecting a phase difference between a reference signal and received echo signals generated at a depth;

Fourier means for implementing a Fourier transformation on signals resulting from the phase difference data obtained by said phase difference detecting means and for computing the speed of a ship with respect to the water at the depth based on Fourier spectra data obtained from the Fourier transformation; and velocity means for computing the velocity of the water at the depth based on the speed of the ship with respect to the ground and the speed of the ship with respect to the water.

13. The apparatus as claimed in claim 12 wherein said navigational means is a Global Positioning System Receiver.

14. An apparatus for measuring a speed of a ship with respect to water and the speed of the ship with respect to the ground and determining a velocity of a water current based on the speeds of the ship comprising:

speed means for measuring the speed of the ship with respect to the ground;

transmitting means for transmitting ultrasonic signals into the water;

period detecting means for detecting a period for each pulse in received echo signals generated at the water during a given measurement time;

period judging means for determining whether a period detected by said period detecting means is in a normal period range;

average period computing means for computing an average period from a plurality of periods which are judged as normal by said period judging means;

inverse means for obtaining a Doppler shift frequency from an inverse value of the average period obtained by said average period computing means;

speed computing means for computing the speed of the ship with respect to the water based on the obtained Doppler shift frequency; and water current velocity computing means for computing the velocity of the water current at the depth at which the echo signals are generated based on the speed of the ship with respect to the water.

15. The apparatus as claimed in claim 14 wherein said speed means is a Global Positioning System Receiver.

16. A system for measuring a speed of a ship with respect to water and the speed of the ship with respect to the ground and determining a velocity of a water current based on the speeds of the ship comprising:

a first apparatus for measuring the speed of a moving body;

said first apparatus including, speed means for measuring the speed of the ship with respect to the ground, transmitting means for transmitting ultrasonic signals into the water, phase difference detecting means for detecting a phase difference between a reference signal and received echo signals generated at a depth, first computing means for implementing a Fourier transformation on the phase difference data obtained by said phase difference detecting means and for computing the speed of the ship with respect to the water at the depth based on the Fourier spectrum data obtained from the Fourier transformation, and second computing means for computing the velocity of a water current at a depth at which the ultrasonic echo signals are generated based on the speed of the ship with respect to the ground and the speed of the ship with respect to the water obtained from said first computing means;

a second apparatus for measuring the speed of a moving body;

said second apparatus including, period detecting means for detecting a period for each pulse in received echo signal generated in the water during a given measurement time, period judging means for determining whether a period detected by said period detecting means is in a normal period range, average period computing means for computing an average period from a plurality of periods which are judged as normal by said period judging means, inverse means for obtaining a Doppler shift frequency from an inverse value of the average period obtained by said average period computing means, speed computing means for computing the speed of the ship with respect to the water based on the obtained Doppler shift frequency, and water current velocity computing means for computing the velocity of the water current at the depth at which the echo signals are generated based on the speed of the ship with respect to the ground and the speed of the ship with respect to the water obtained from said speed computing means; and switching means for selecting first apparatus for measuring the speed of a moving body or said second apparatus for measuring the speed of a moving body.

17. The apparatus as claimed in claim 16 wherein said speed means is a Global Positioning System Receiver.

18. The apparatus as claimed in claim 16 wherein said speed means measures a position of at least two points on the Earth and a time required to travel between the two points and obtains the speed of the ship with respect to the ground based on the measured positions and time.

19. A method for measuring a speed of a ship with respect to the ground and a speed of the ship with respect to water and determining a velocity of a water current comprising the steps of:

(a) measuring a position of at least two points on the Earth and a time required to travel between the two points and for obtaining the speed of the ship with respect to the ground based on the measured positions and time;
(b) transmitting ultrasonic signals into the water;
(c) detecting a phase difference between a reference signal and received echo signals generated at a depth;
(d) implementing a Fourier transformation on signals resulting from the phase difference data obtained by said step (c) and computing the speed of a ship with respect to the water at the depth based on Fourier spectrum data obtained from the Fourier transformation; and
(e) computing the velocity of the water current at the depth based on the speed of a ship with respect to the ground and the speed of the ship with respect to the water.

20. A method for measuring a Doppler frequency shift comprising the steps of:
(a) detecting a period for each pulse in the echo signals during a given measurement time;
(b) determining whether the period detected by said step (a) is in a normal period range;
(c) computing an average period from a plurality of periods which are judged as normal by said step (b); and
(d) obtaining a Doppler shift frequency from an inverse value of the average period obtained by said step (c).

21. A method for determining a velocity of a water current by detecting a Doppler shift frequency generated with ultrasonic echo signals propagating in the water comprising the steps of:
(a) detecting a period for each pulse in received echo signals generated at a seabed and in water during a given measurement time;
(b) determining whether a period detected by said step (a) is in a normal period range;
(c) computing an average period from a plurality of periods which are judged as normal by said step (b);
(d) obtaining a Doppler shift frequency from an inverse value of the average period obtained by said step (c);
(e) computing a speed of a ship with respect to the seabed and the speed of the ship with respect to the water based on the obtained Doppler shift frequency; and
(f) computing the velocity of the water current at a depth at which the echo signals are generated based on the speed of the ship with respect to the seabed and the speed of the ship with respect to the water.

22. A method for measuring a speed of a ship with respect to water and the speed of the ship with respect to ground and determines a velocity of a water current based on the speeds of the ship comprising the steps of:
(a) measuring the speed of the ship with respect to the ground using navigational data;
(b) transmitting ultrasonic signals into the water;
(c) detecting a phase difference between a reference signal and received echo signals generated at a depth;
(d) implementing a Fourier transformation on signals resulting from the phase difference data obtained by said step (c) and computing the speed of a ship with respect to the water at the depth based on Fourier spectra data obtained from the Fourier transformation; and
(e) computing the velocity of the water at the depth based on the speed of the ship with respect to the ground and the speed of the ship with respect to the water.

23. The method as claimed in claim 22 wherein said step (a) measures the speed of the ship with respect to the ground using a Global Positioning System Receiver.

24. An apparatus for measuring a velocity of a moving body which measures a speed of a ship with respect to water by detecting a Doppler frequency shift contained in an ultrasonic echo signal propagating through the water comprising:
phase difference detecting means for detecting a phase difference between reference signals and a received echo signal, said phase difference being an angle;
transforming means for transforming the phase difference to a first signal and a second signal, said first signal being a value equal to a cosine of said phase difference, said second signal being a value equal to a sine of said phase difference;
multiplying means for multiplying said first and second signals by a Hanning window to produce third and fourth signals, respectively;
Fourier means for implementing a Fourier transformation on said third and fourth signals to obtain a Fourier spectrum;
first means for applying a frequency interpolation on the Fourier spectrum to obtain a Doppler frequency shift; and
speed means for computing the speed of the ship with respect to the water based on the Doppler frequency shift.

25. The apparatus for measuring the velocity of a moving body as claimed in claim 24 wherein said phase difference detecting means detects a phase difference between an echo signal and a reference clock signal.

26. An apparatus for measuring a speed of a moving body which measures a speed of a ship with respect to ground by detecting a Doppler frequency shift contained in an ultrasonic echo signal propagating through water comprising:
phase difference detecting means for detecting a phase difference between reference signals and a received echo signal, said phase difference being an angle;
transforming means for transforming the phase difference to a first signal and a second signal, said first signal being a value equal to a cosine of said phase difference, said second signal being a value equal to a sine of said phase difference;
multiplying means for multiplying said first and second signals by a Hanning window to produce third and fourth signals, respectively;
Fourier means for implementing a Fourier transformation on said third and fourth signals to obtain a Fourier spectrum;
first means for applying a frequency interpolation on the Fourier spectrum to obtain a Doppler frequency shift; and
speed means for computing the speed of the ship with respect to the ground based on the Doppler frequency shift.

27. An apparatus for measuring a speed of a moving body which measures a velocity of a water current by detecting a Doppler frequency shift contained in ultrasonic echo signals propagating through the water comprising:
  phase difference detecting means for detecting a first phase difference between a reference signal and echo signals generated at a seabed and for detecting a second phase difference between a reference signal and echo signals generated at a certain depth;
  arithmetic means for computing a difference between said first and second phase difference;
  transforming means for transforming said difference first and second signals, said first signal being a value equal to a cosine of said difference, said second signal being a value equal to a sine of said difference;
  multiplying means for multiplying said first and second signals by a Hanning window to produce third and fourth signals, respectively;
  Fourier means for implementing Fourier transformations on said third and fourth signals to obtain a Fourier spectrum;
  first means for applying a frequency interpolation on the Fourier spectrum to obtain a Doppler frequency shift; and
  speed means for computing the velocity of the water current based on the Doppler frequency shift.

28. An apparatus for measuring a speed of a moving body which measures a velocity of a water current flow by detecting a Doppler frequency shift contained in ultrasonic echo signals propagating through the water comprising:
  phase difference detecting means for detecting a first phase difference between a reference signal and echo signals generated at a seabed and for detecting a second phase difference between a reference signal and echo signals generated at a certain depth;
  transforming means for transforming said first and second phase differences into first, second, third, and fourth signals, said first signal being a value equal to a cosine of said first phase difference, said second signal being a value equal to a sine of said first phase difference, said third signal being a value equal to a cosine of said second phase difference, said fourth signal being a value equal to a sine of said second phase difference;
  multiplying means for multiplying said first, second, third, and fourth signals by a Hanning window to produce a first, second, third, and fourth product;
  Fourier means for implementing Fourier transformations on said first, second, third, and fourth products to obtain Fourier spectra;
  first means for applying a frequency interpolation on the Fourier spectra to obtain Doppler frequency shifts;
  speed means for computing the speed of a ship with respect to ground and the speed of the ship with respect to the water based on the resultant Doppler frequency shifts; and
  velocity means for computing the velocity of the water current based on the speed of the ship with respect to the ground and the speed of the ship with respect to the water.

29. An apparatus for measuring a speed of a moving body which measures a velocity of water current flows by detecting Doppler frequency shifts contained in ultrasonic echo signals propagating through the water comprising:
  phase difference detecting means for respectively detecting a first phase difference between a reference signal and echo signals generated at a seabed and a second phase difference between the reference signal and echo signals generated at a plurality of depths;
  difference means for computing a difference between said first and second phase differences;
  transforming means for transforming said difference into first and second signals, said first signal being a value equal to a cosine of said difference, said second signal being a value equal to a sine of said difference;
  multiplying means for multiplying said first and second signals by a Hanning window to produce third and fourth signals, respectively;
  Fourier means for implementing Fourier transformations on said third and fourth signals to obtain Fourier spectra;
  first means for applying a frequency interpolation on the Fourier spectra to obtain Doppler frequency shifts; and
  speed means for computing the velocity of the water current flowing at a plurality of depths based on the Doppler frequency shifts.

30. The apparatus for measuring the speed of a moving body as claimed in claim 29 wherein said reference signal is a reference clock signal.

31. An apparatus for measuring a speed of a ship with respect to ground and a speed of the ship with respect to water and determining a velocity of a water current comprising:
  speed means for measuring a position of at least two points on Earth and a time required to travel between the two points and for obtaining the speed of the ship with respect to the ground based on the measured positions and time;
  transmitting means for transmitting ultrasonic signals into the water;
  receiving means for receiving echo signals generated at a depth;
  Fourier means for implementing a Fourier transformation on signals resulting from the received echo signals and for computing the speed of a ship with respect to the water at the depth based on the Fourier spectrum data obtained from the Fourier transformation; and
  velocity means for computing the velocity of the water current at the depth based on the speed of the ship with respect to the ground and the speed of the ship with respect to the water.

32. An apparatus for measuring a speed of a ship with respect to ground and a speed of the ship with respect to water and determining a velocity of a water current comprising:
  speed means for measuring a position of at least two points on Earth and a time required to travel between the two points and for obtaining the speed of the ship with respect to the ground based on the measured positions and time;
  transmitting means for transmitting ultrasonic signals into the water;
  receiving means for receiving echo signals generated at a depth;

multiplying means for multiplying signals resulting from the echo signals by a Hanning window to produce product signals;

Fourier means for implementing a Fourier transformation on said product signals to obtain a Fourier spectrum;

first means for applying a frequency interpolation on the Fourier spectrum to obtain a Doppler frequency;

speed means for computing the speed of the ship with respect to the water based on the Doppler frequency; and velocity means for computing the velocity of the water current at the depth based on the speed of the ship with respect to the ground and the speed of the ship with respect to the water.

33. An apparatus for measuring a speed of a ship with respect to ground and a speed of the ship with respect to water and determining a velocity of a water current comprising:

speed means for measuring a position of at least two points on Earth and a time required to travel between the two points and for obtaining the speed of the ship with respect to the ground based on the measured positions and time;

transmitting means for transmitting ultrasonic signals into the water;

receiving means for receiving echo signals generated at a plurality of depths;

Fourier means for implementing Fourier transformations on signals resulting from the received echo signals and for computing the speed of a ship with respect to the water at the plurality of the depths based on the Fourier spectra data obtained from the Fourier transformations; and velocity means for computing the velocity of water currents at the plurality of the depths based on the speed of the ship with respect to the ground and the speed of the ship with respect to the water at the plurality of depths.

34. An apparatus for measuring a speed of a ship with respect to ground and a speed of the ship with respect to water and determining a velocity of a water current comprising:

speed means for measuring a position of at least two points on Earth and a time required to travel between the two points and for obtaining the speed of the ship with respect to the ground based on the measured positions and time;

transmitting means for transmitting ultrasonic signals into the water;

receiving means for receiving echo signals generated at a plurality of depths;

multiplying means for multiplying signals resulting from the echo signals by a Hanning window to produce product signals;

Fourier means for implementing Fourier transformations on said product signals to obtain Fourier spectra;

first means for applying a frequency interpolation on the Fourier spectra to obtain Doppler frequencies;

speed means for computing the speeds of the ship with respect to the water at the plurality of the depths based on the Doppler frequencies; and velocity means for computing the velocity of the water current at the plurality of depths based on the speed of the ship with respect to the ground of the and the speed of the ship with respect to the water at the plurality of depths.

35. An apparatus for measuring a speed of a ship with respect to ground and a speed of the ship with respect to water and determining a velocity of a water current comprising:

navigational means for measuring the speed of the ship with respect to ground using navigational data;

transmitting means for transmitting ultrasonic signals into the water;

receiving means for receiving echo signals generated at a depth;

Fourier means for implementing a Fourier transformation on signals resulting from the received echo signals and for computing the speed of a ship with respect to the water at the depth based on the Fourier spectrum data obtained from the Fourier transformation; and velocity means for computing the velocity of the water current at the depth based on the speed of the ship with respect to the ground and the speed of the ship with respect to the water.

36. An apparatus for measuring a speed of a ship with respect to ground and a speed of the ship with respect to water and determining a velocity of a water current comprising:

navigational means for measuring the speed of the ship with respect to the ground using navigational data;

transmitting means for transmitting ultrasonic signals into water;

receiving means for receiving echo signals generated at a plurality of depths;

Fourier means for implementing Fourier transformations on signals resulting from the received echo signals and for computing the speed of the ship with respect to the water at the plurality of the depths based on the Fourier spectra data obtained from the Fourier transformations; and velocity means for computing the velocity of water currents at the plurality of the depths based on the speed of the ship with respect to the ground and the speed of the ship with respect to the water at the plurality of depths.

37. An apparatus for measuring a speed of a ship with respect to ground and a speed of the ship with respect to water and determining a velocity of a water current comprising:

navigational means for measuring the speed of the ship with respect to the ground using navigational data;

transmitting means for transmitting ultrasonic signals into the water;

receiving means for receiving echo signals generated at a plurality of depths;

multiplying means for multiplying signals resulting from the echo signals by a Hanning window to produce product signals;

Fourier means for implementing Fourier transformations on and product signals to obtain Fourier spectra;

first means for applying a frequency interpolation on the Fourier spectra to obtain Doppler frequencies;

means for computing the speeds of the ship with respect to the water at the plurality of the depths based on the Doppler frequencies; and velocity means for computing the velocity of the water current at the plurality of depths based on the speed of the ship with respect to the ground and the speed of the ship with respect to the water at the plurality of depths.

* * * * *